United States Patent [19]

Nomura et al.

[11] Patent Number: 5,846,677

[45] Date of Patent: Dec. 8, 1998

[54] COLOR FILTER, COLOR FILTER-EQUIPPED DISPLAY DEVICE AND METHOD FOR MANUFACTURING SAME

[75] Inventors: Yuji Nomura; Satoshi Tanaka; Yasuyuki Naito, all of Mobara, Japan

[73] Assignee: Futaba Denshi Kogyo K.K., Mobara, Japan

[21] Appl. No.: 814,356

[22] Filed: Mar. 11, 1997

[30] Foreign Application Priority Data

Mar. 12, 1996 [JP] Japan ................................. 8-055064
Mar. 12, 1996 [JP] Japan ................................. 8-055065

[51] Int. Cl.$^6$ ........................... G02B 5/20; H01J 1/62; H01J 61/40
[52] U.S. Cl. .......................... 430/7; 430/312; 430/321; 313/112; 313/496
[58] Field of Search .................... 430/7, 27, 321, 430/312; 349/106; 313/496, 112

[56] References Cited

U.S. PATENT DOCUMENTS 5,543,685  8/1996  Okamoto et al. ....................... 313/496
5,667,888  9/1997  Yoshida et al. ......................... 428/336

FOREIGN PATENT DOCUMENTS 8-313720  11/1996  Japan .

Primary Examiner—John A. McPherson
Attorney, Agent, or Firm—Oblon, Spivak, McClelland, Maier & Neustadt, P.C.

[57] ABSTRACT

A thin-film filter which is uniform in thickness and has a smooth surface is provided. A filter forming liquid containing a ultrafine pigment, a photosensitive organic Si compound and a high-boiling polar solvent is coated on a glass substrate to form a filter film, which is subject to light exposure through a mask and then development, to thereby carry out patterning, followed by calcination of the glass substrate, leading to manufacturing of a color filter.

12 Claims, 2 Drawing Sheets

COLOR FILTER, COLOR FILTER-EQUIPPED DISPLAY DEVICE AND METHOD FOR MANUFACTURING SAME

BACKGROUND OF THE INVENTION

This invention relates to a color filter, and more particularly to a color filter serving as a functional film or the like, a method for manufacturing the color filter, a display device equipped with such a color filter and a method for manufacturing the display device.

A fluorescent display device is often provided on a display plane thereof with a color filter for the purpose of preventing reflection and/or realizing color display. Manufacturing of the fluorescent display device typically includes a heat treatment generally carried out at a temperature as high as about 500° C. Thus, a color filter made of an organic material which is generally incorporated in an LCD or the like is not applied to manufacturing of a color filter-equipped fluorescent display device, therefore, it is required to develop a color filter made of an inorganic material which fully withstands such an increased temperature. For example, Japanese Patent Application Laid-Open Publication No. 160618/1994 teaches a color filter manufactured by preparing a paste mainly consisting of an inorganic pigment and low-melting frit glass, printing the paste on a substrate by screen printing and subjecting the paste-printed substrate to calcination, to thereby provide a filter of a thick film.

The thick-film filter thus prepared has a rugged surface, so that it is highly difficult to uniformly form an anode conductor of a thin film on the thick-film filter. Also, the rugged thick-film filter tends to cause disconnection of the anode conductor even when it is formed on the filter. In order to eliminate such disadvantages, it would be considered to increase a thickness of the anode conductor to be formed on the filter. Unfortunately, this leads to a reduction in light transmittance.

SUMMARY OF THE INVENTION

The present invention has been made in view of the foregoing disadvantage of the prior art.

Accordingly, it is an object of the present invention to provide a filter of a thin film which has a uniform thickness and a smooth surface.

It is another object of the present invention to provide a method for manufacturing such a thin-film filter.

It is a further object of the present invention to provide a display device equipped with such a thin-film filter.

It is still another object of the present invention to provide a method for manufacturing such a filter-equipped display device.

In accordance with one aspect of the present invention, a color filter is provided. The color filter includes $SiO_2$ prepared by calcination of an organic Si compound and arranged on a glass substrate and a fine-particle pigment dispersed in the $SiO_2$ and fixed therein.

In a preferred embodiment of the present invention, the organic Si compound is a polymer prepared by subjecting four-functionality alkoxysilane and alkyl group-containing alkoxysilane to copolymerization.

In a preferred embodiment of the present invention, the organic Si compound is a photosensitive group-containing polymer which is prepared by subjecting four-functionality alkoxysilane and photosensitive group-containing alkoxysilane to copolymerization.

In a preferred embodiment of the present invention, the organic Si compound includes a photopolymerization initiator and an auxiliary.

In a preferred embodiment of the present invention, the fine-particle pigment has a particle diameter of 0.1 μm or less.

In a preferred embodiment of the present invention, a ratio at which the four-functionality alkoxysilane and alkyl group-containing alkoxysilane are mixed with each other is varied, resulting in the number of alkyl groups in the polymer being controlled.

In a preferred embodiment of the present invention, a ratio at which the four-functionality alkoxysilane and photosensitive group-containing alkoxysilane are mixed with each other is varied, resulting in the number of photosensitive groups in the polymer being controlled.

In accordance with another aspect of the present invention, a method for manufacturing a color filter is provided. The method comprises the steps of preparing a filter forming liquid containing a fine-particle pigment, an organic Si compound and a high-boiling polar solvent; applying the filter forming liquid on a surface of a glass substrate to form a filter film; subjecting the filter film to patterning; and subjecting the glass substrate to calcination.

In a preferred embodiment of the present invention, a procedure is repeatedly carried out on the glass substrate for each of a plurality of color filter forming liquids to form a plurality of color filters on the glass substrate. The procedure comprises the steps of coating the filter forming liquid on the glass substrate to form the filter film; coating a resist on the filter film; exposing the resist on the filter film to light through a mask of a pattern predetermined depending on the filter forming liquid used; removing, by development, a portion of the resist out of a pattern of a filter to be formed; and removing, by etching, a portion of the filter film positioned around the resist formed into the pattern of the filter to be formed, followed by removal of the resist.

In a preferred embodiment of the present invention, a procedure is repeatedly carried out on the glass substrate for each of a plurality of color filter forming liquids to form a plurality of color filters on the glass substrate. The procedure comprises the steps of coating the filter forming liquid on the glass substrate to form the filter film; exposing the filter film to light though a mask of a pattern predetermined defending on the filter forming liquid used; and removing, by development, a portion of the filter film other than a portion thereof acting as a filter.

In accordance with a further aspect of the present invention, a color filter-equipped display device including an anode conductor is provided. The device includes a glass substrate, a color filter obtained as described above, a light-permeable anode conductor formed on the color filter and a phosphor layer formed on the anode conductor.

In accordance with still another aspect of the present invention, method for manufacturing a color filter-equipped display device is provided. The method comprises the steps of forming a black matrix on a glass substrate, forming a color filter on the glass substrate as described above, forming a light-permeable anode conductor on the color filter, and forming a phosphor layer on the anode conductor.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
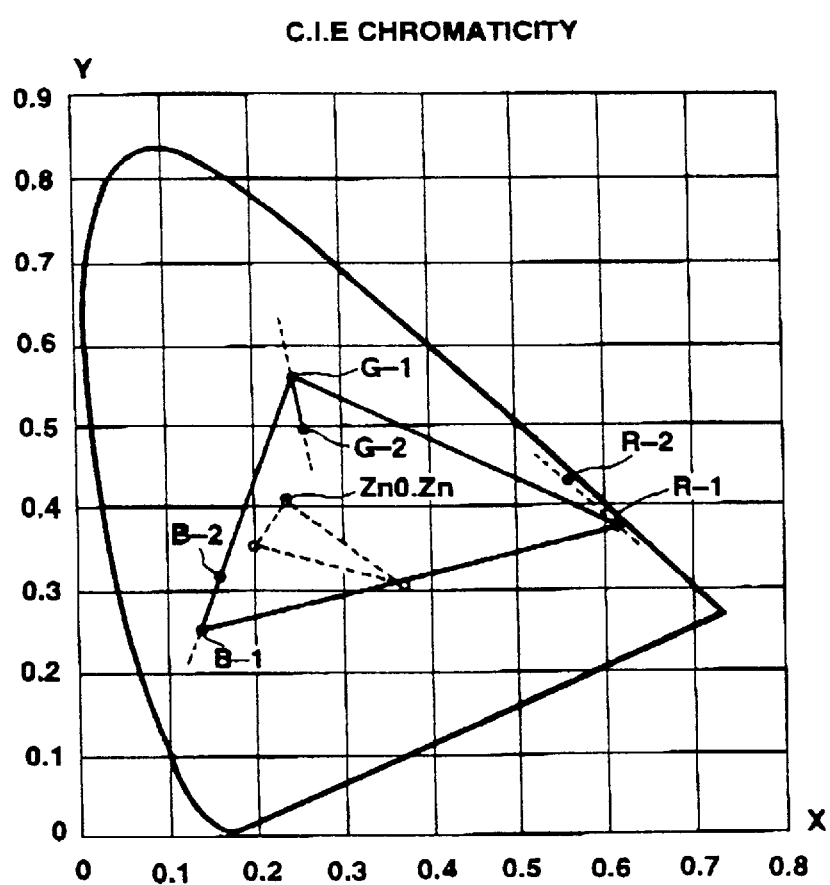
FIG. 1 is a CIE chromaticity diagram showing chromaticity of each of a color filter of the present invention and a conventional color filter.

Now, the present invention will be described hereinafter with reference to FIGS. 1 to 3, which illustrate an embodiment of each of a color filter and a color filter-equipped fluorescent display device according to the present invention. A color filter of the illustrated embodiment is constructed so as to exhibit three colors or red (R), green (G) and blue (B) colors. First, materials such as a filter forming liquid and the like which are used for manufacturing the color filter will be described. The filter forming liquid is formed by subjecting materials described below to mixing and dispersion. The filter forming liquid contains a photosensitive material and is coated on a glass substrate. Then, the filter forming liquid is subject to patterning and development using a mask and a light irradiation unit, resulting in a filter of any desired shape being formed.

(1) Pigment

Pigments are in the form of ultrafine particles having an average particle diameter of 0.1 $\mu$m or less. A pigment of a blue color (B) is made of CoO and $Al_2O^3$ and having a specific surface area of 30 to 60 $m^2/g$. A pigment of a red color (R) is made of $Fe_2O_3$ and has a specific surface area of 120 $m^2/g$. A pigment of a green color (G) is made of (Ti·Ni·Co·Zn) O and has a specific surface are of 50 $m^2/g$.

(2) Photosensitive Organic Si Compound as Organic Si Compound.

In the illustrated embodiment, the filter is formed on the glass substrate. Si in a photosensitive organic Si compound conforms to glass, so that $SiO_2$ is suitable for use as a fixing agent with respect to glass. As will be apparent from a reaction formula (1) described below, copolymerization between a four-functionality alkoxysilane and a silane coupling agent comprising photosensitive group-containing alkoxysilane leads to formation of a photosensitive group-containing polymer. The photosensitive organic Si compound described above comprises the thus-formed polymer. Alternatively, it comprises at least the polymer.

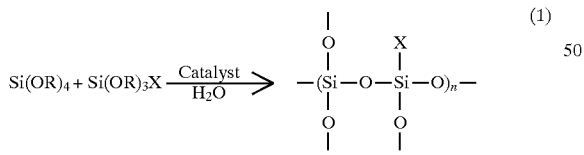

In the reaction formula (1), R is an alkyl group and X is a photosensitive group. A ratio of the four-functionality alkoxysilane to the photosensitive group-containing alkoxysilane may be set as desired within a range of from 50:50 to 0:100. The silane coupling agents having a photosensitive group may include silane coupling agents each having a photosensitive group such as an acryloyl group, a vinyl group or the like. For example, the silane coupling agents include vinyl trimethoxy silane expressed by a chemical formula (2) described below, γ-methacryloxy propyl trimethoxy silane expressed by a chemical formula (3) described below, γ-methacryloxy propyl triethoxy silane expressed by a chemical formula (4) described below and the like.

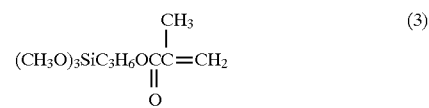

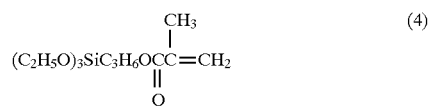

(3) Solvent (a) In order to liquify the above-described photosensitive organic Si compound to facilitate coating of the Si compound onto the glass substrate, a high-boiling polypropylene polar solvent is used. The solvent is advantageous in that it is hard to be dried because of having a high-boiling point, resulting in being coated in a reduced thickness. Also, it is a polar solvent, to thereby facilitate dispersion of other ingredients therein. The solvents include, for example, dipropylene glycol methyl ether (boiling point: 188° C.), tripropylene glycol methyl ether (242° C.), ethylene glycol methyl ether (125° C.), ethylene glycol ethyl ether (136° C.), ethylene glycol butyl ether (171° C.), diethylene glycol methyl ether (194° C.), diethylene glycol ethyl ether (202° C.) and diethylene glycol butyl ether (230° C.)

(b) As required, photo-setting resin such as, for example, a monomer represented by PEG, HEMA or the like may be added to the solvent. In the illustrated embodiment, the photosensitive organic Si compound is used as the organic Si compound, therefore, addition of photo-setting resin is not necessarily required. Nevertheless, addition of the resin contributes to an increase in sensitivity of the solvent to ultraviolet rays.

(4) Photopolymerization Initiator

In order to satisfactorily start a curing reaction of the filter forming liquid, a thioxanthone photopolymerization initiator such as DETX (diethylthioxanthone), a benzophenone photopolymerlzation initiator such as BP100, or the like may be added to the filter forming liquid. DETX has such a structure as expressed by the following chemical formula (5):

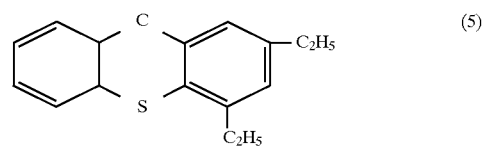

(5) Auxiliary

An amine auxiliary such as triethanol amine (TEA) or the like may be added as an auxiliary for the initiator to the filter forming liquid.

The materials described above are used to prepare the filter forming liquid. For this purpose, first, 20% of the pigment, 10% of the photosensitive organic Si compound and 70% of the solvent are mixed together on the weight basis, to thereby obtain a mixture. The mixture thus obtained is subject to dispersion, to thereby dissociate the pigment into primary particles. The dispersion may be carried out by means of a ball mill, a sand grinder (nanomizer) or the like. Such dissociation causes the primary particles to have a particle diameter of 0.1 $\mu$m or less, to thereby improve light permeability of the filter. The solvent may be entirely or partially replaced with photo-setting resin and the photopolymerization initiator and auxiliary each may be added in a suitable amount.

The filter forming liquid thus prepared is coated on a surface of the glass plate by means of a spinner. The spinner includes a disc rotated at a speed of 1000 to 3000 rpm. The glass substrate is fixed an the disc, which is then rotated at a predetermined speed. Then, the filter forming liquid is dropped in a suitable amount on the glass substrate rotated with the disc, resulting in forming a thin film on the glass plate while being outwardly spread by centrifugal force applied thereto, so that a filter film is prepared.

The amount of filter forming liquid dropped, a rotational speed of the glass plate, a period of time required for formation of the filter film and the like may be suitable adjusted to permit the filter film to be formed into a desired thickness.

Subsequently, the glass substrate having the filter film thus formed thereon is subject to pre-baking at 120° to 150° C. Then, a mask which has a filter pattern determined depending on a color of the filter forming liquid is placed on the glass substrate, which is then exposed to light through the mask, followed by development of the glass substrate, resulting in the filter film of the color being formed into a predetermined pattern. Thereafter, the glass substrate is subject to post-baking at 140° to 150° C.

Such a procedure as described above is carried out on each of the R, G and B filter forming liquids, so that filter films of three colors each formed into a predetermined pattern may be formed on the glass substrate. Then, the glass substrate is subject to calcination in an oxidizing atmosphere. This causes an organic material in the filter films to be decomposed in the oxidizing atmosphere and Si to be oxidized into $SiO_2$. The thus-formed $SiO_2$ contributes to fixing of ultrafine particles of the pigment, resulting in the R, G and B filters being obtained.

Table 1 shows light transmittance of each of the R, G and B color filters on X-Y coordinates of a CIE chromaticity diagram. Table 2 shows light transmittance of each of conventional R, G and B color filters on X-Y coordinates of a CIE chromaticity diagram. In each of Tables 1 and 2, light emitted from a ZnO:Zn phosphor was used as a light source. The chromaticity was x=0.235 and y=0.405.

TABLE 1

|       |     | X     | Y     | Transmittance (%) |
|-------|-----|-------|-------|-------------------|
| Blue  | B-1 | 0.138 | 0.245 | 15.0              |
|       | B-2 | 0.161 | 0.310 | 25.0              |
| Red   | R-1 | 0.612 | 0.383 | 5.0               |
|       | R-2 | 0.569 | 0.425 | 10.0              |
| Green | G-1 | 0.251 | 0.563 | 41.0              |
|       | G-2 | 0.257 | 0.495 | 67.0              |

TABLE 2

| —    | X     | Y     | Trasmittance (%) |
|------|-------|-------|------------------|
| Blue | 0.200 | 0.340 | 15.0             |
| Red  | 0.380 | 0.300 | 10.0             |

The transmittance values indicated In Tables 1 and 2 are plotted in FIG. 1.

As will be noted from Tables 1 and 2 and FIG. 1, the filter of the present invention is superior in both purity of color and light transmittance to the conventional filter.

The present invention permits the photosensitive organic Si compound to not only promote dispersion of the pigment in the filter forming liquid but keep the pigment dispersed in the liquid.

The photosensitive organic Si compound is converted into $SiO_2$ by calcination, so that the filter obtained may exhibit highly increased fixing strength as high as 9H in a pencil hardness test.

Figure 2A:
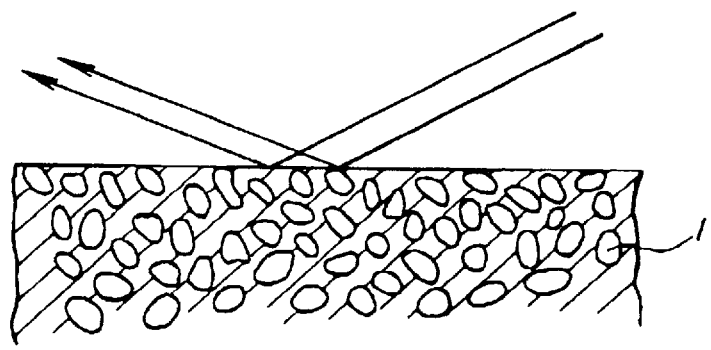
FIG. 2(a) is a sectional view showing an embodiment of a color filter according to the present invention.
Figure 2B:
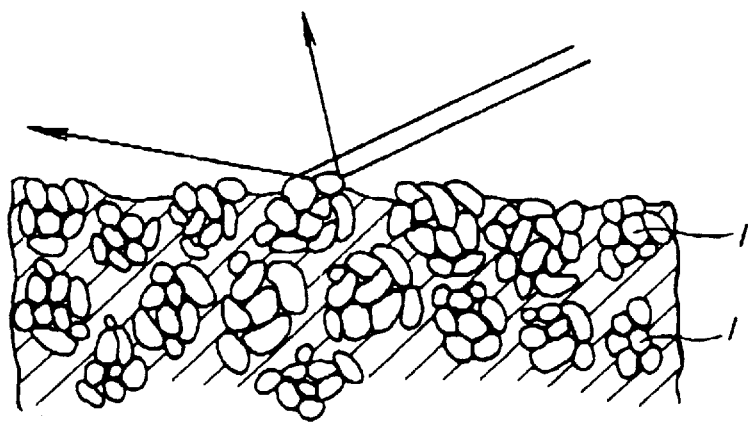
FIG. 2(b) is a sectional view showing a conventional color filter.
Figure 3:
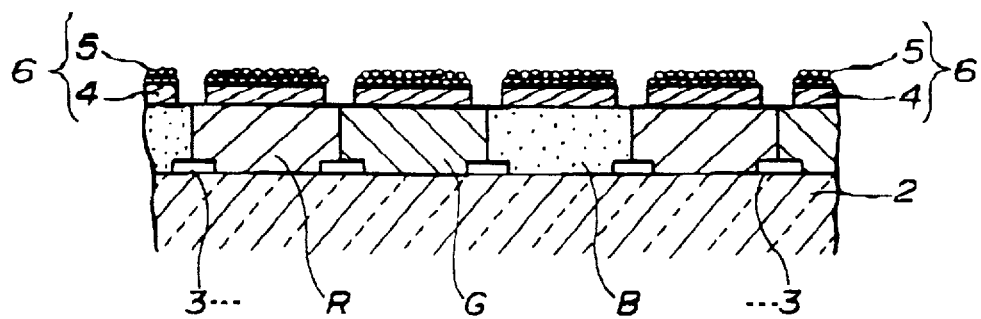
FIG. 3 is a sectional view showing a fluorescent display device equipped with a color filter of the present invention.

In the present invention, as shown in FIG. 2(a), a pigment 1 is fixed while being kept satisfactorily dispersed, to thereby permit the filter to be increased in filter characteristics and have a flat surface exhibiting good glossiness. On the contrary, the conventional filter, as shown in FIG. 2(b), causes a pigment 1 in the filter to be coalesced, to thereby render a surface of the filter rugged to a degree sufficient to cause incident light to be scattered on the surface. For example, it was found that supposing that reflectance of a reference plate glass is 100, the blue filter, red filter and green filter in the illustrated embodiment exhibit reflectance of 100, 125 and 100, respectively. Also, it was found that the conventional filter of which the surface is rugged due to coalescence of the pigment exhibit reflectance of 10 or less.

In the illustrated embodiment, the photosensitive group and alkyl group of the photosensitive organic Si compound function to alleviate stress occurring inside the filter film during formation of $SiO_2$ due to calcination of the photosensitive organic Si compound. The photosensitive group and alkyl group are hard to be oxidized, to thereby be kept from being burned in a moment, so that the film is calcined without cracking, resulting in being gradually converted into glass. This permits a thickness of the filter to be increased to a level as large as about 25 $\mu$m while preventing it from cracking.

In the illustrated embodiment, the inorganic material such as the pigment and an OH group exhibit satisfactory affinity for each other and the organic solvent and alkyl group likewise exhibit good affinity for each other. Such a coupling effect permits the pigment to be dispersed in the liquid phase and kept dispersed. Also, compatibility between the solvent and the pigment may be improved depending on the alkyl group of the photosensitive organic Si compound.

The photosensitive organic Si compound acting as the organic Si compound in the illustrated embodiment may be obtained according to the following reaction formula (6) in addition to the above-described reaction formula (1):

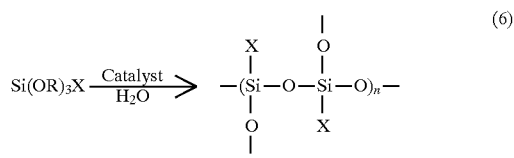

The reaction takes place under the conditions that a ratio of the four-functionality alkoxysilane to the silane coupling agent comprising the photosensitive group-containing alkoxysilane in the reaction formula (1) wherein both materials are subject to copolymerization is set at 0:100. Thus, such copolymerization of the silane coupling agent comprising the photosensitive group-containing alkoxysilane leads to formation of a polymer having a photosensitive group.

A variation in ratio between the four-functionality alkoxysilane and the silane coupling agent comprising the photosensitive group-containing alkoxysilane in the reaction formula wherein both materials are subject to copolymerization permits the number of photosensitive groups contained in the thus-obtained photosensitive organic Si compound to be adjusted. Such adjustment of the number of photosensitive groups results in the action of the photosensitive organic Si compound of preventing cracking of the filter being varied. For example, when it is desired to manufacture the filter somewhat increased in thickness, the photosensitive organic Si compound may be prepared while increasing a ratio of the silane coupling agent comprising the photosensitive group-containing alkoxysliane to the alkoxysilane.

Now, a fluorescent display device which is a filter-equipped display device having the thus-constructed color filter incorporated therein will be described hereinafter with reference to FIG. 3.

First, an anode substrate 2 which is a glass substrate is formed thereon with a black matrix 3. Then, the anode substrate 2 is coated on a surface thereof on which the black matrix 3 is arranged with a filter forming liquid, to thereby form a filter film. A mask having a pattern predetermined depending on a type or color of the filter forming liquid used is prepared and then arranged above the anode substrate 2. The filter film is exposed to light through the mask and then a portion of the filter film other than a portion thereof acting as a filter is removed by development. Then, the anode substrate 2 is subject to post-baking. The procedure described above is repeatedly carried out for each of R (red), G (green) and B (blue) filter forming liquids. This leads to formation of filter films of three colors post-baked. Then, the anode substrate 2 is subject to calcination, resulting in R, G and B filters being completed.

Then, the R, G and B filters on the anode substrate 2 each are formed thereon with a transparent anode conductor 4 made of an ITO film or the like. Then, the anode conductors 4 each are provided thereon with a phosphor layer, leading to formation of an anode 6. Control electrodes (now shown) are arranged above the anodes 6 of the anode substrate 2. Also, filamentary cathodes are stretchedly arranged above the control electrodes so as to act as an electron source. Then, a box-like casing is sealedly joined to the anode substrate 2 while being kept facing an upper surface of the anode substrate 2, resulting in a box-like envelope being provided in which the above-described electrodes are received. The envelope is then evacuated to form a high vacuum therein.

When the fluorescent display device thus constructed is driven to permit the cathode to emit electrons, the electrons are accelerated and controlled by the control electrodes, resulting in being impinged on the phosphor layers 5 of the anodes 6, leading to luminescence of the phosphor layers 5. The luminescence thus obtained is observed through the light-permeable anode conductors 4, R, G and B color filters, and light-permeable anode substrate 2 from an outside of the anode substrate 2. In the illustrated embodiment, the phosphor layer 5 is made of a ZnO:Zn phosphor of a blue-green luminous color. Nevertheless, luminescence of the phosphor layer may be displayed with three colors or R, G and B colors through the R, G and B color filters, respectively.

In the illustrated embodiment, the photosensitive organic Si compound is used as the organic Si compound. However, the organic Si compound is not limited to such a photosensitive organic Si compound. For example, the organic Si compound may be a polymer prepared according to the following reaction formula (7), wherein a four-functionality alkoxysilane and a three-functionality alkoxysilane having a single alkyl group are subject to copolymerization. Alternatively, the organic Si compound may contain at least the polymer.

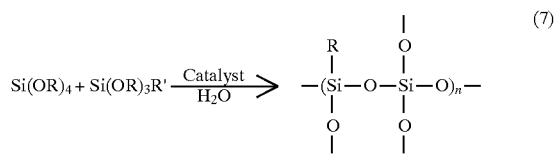

(7)

In the reaction formula (5), the four-functionality alkoxysilanes include, for example, tetramethoxy silane $Si(OCH_3)_4$ and tetraethoxy silane $Si(OC_2H_g)_4$. The three-functionality alkoxysilanes having one alkyl group includes. for example, methyl trimethoxy silane $CH_3-Si(OCH_3)_3$ and methyl triethoxy silane $CH_3-Si(OC_2H_5)_3$.

When the organic Si compound described above is an organic Si compound free from any photosensitive group such as the polymer prepared according to the reaction formula (7), formation of the R, G and B color filters on the glass substrate is carried out using a resist for patterning of the color filter. The remaining materials may be the same as the above, except the photo-setting resin, photopolymerization initiator and auxiliary are excluded.

First, filter forming liquids for red, green and blue colors are prepared. The following procedure is executed for each of the R, G and B filter forming liquids. A glass substrate is coated on a surface thereof with the filter forming liquid, to thereby form a filter film, followed by coating of a resist on the filter film. Then, a mask having a pattern predetermined depending on a type or color of the filter forming liquid used is arranged on the filter film. The resist on the filter film is exposed to light through the mask. A portion of the resist out of a pattern of a color filter to be formed is removed by development, so that a portion of the resist corresponding to the pattern of the color filter may be left. A portion of the filter film around the resist is removed by etching, followed by removal of the resist, resulting in the color filter being obtained. Such a procedure is repeatedly executed on the same glass substrate for each of the R, G and B filter forming liquids. Repeated execution of the procedure permits an anode substrate substantially identical with the anode substrate 2 shown in FIG. 3 to be formed, which is then used to construct a fluorescent display device substantially identical with the embodiment described above.

As can be seen from the foregoing, the color filter of the present invention permits a range of reproduction of colors to be increased when a ZnO:Zn phosphor is used as a light source.

Also, the color filter of the present invention is so constructed that the organic Si compound is converted into $SiO_2$ by calcination and the pigment is dispersed therein. Thus, the filter exhibits increased film strength.

Further, when the organic Si compound used for the color filter has a photosensitive group, patterning of the color filter may be carried out directly by photolithography without using any resist. Also, when the organic Si compound has a photosensitive group, the photosensitive group alleviates stress in the filter film during conversion of the organic Si compound into the $SiO_2$ by calcination, so that a thickness of the filter film may be suitably controlled while being reduced to a level as small as about 25 μm and kept from cracking.

In addition, when the organic Si compound has an alkyl group, the alkyl group alleviates stress in the film during conversion of the organic Si compound into the $SiO_2$ by calcination, so that a thickness of the filter film may be suitably controlled while being reduced to a level as small as about 25 μm and kept from cracking.

Moreover, the surface of the color filter of the present invention exhibits characteristics like a glass film and glossiness like a sheet glass, after it is subject to calcination. Thus, when the color filter is formed thereon with any additional functional film in a subsequent step, the functional film may be formed into substantially the same thickness and quality as those obtained when it is formed on a glass sheet.

While a preferred embodiment of invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A color filter comprising:

$SiO_2$ prepared by calcination of an organic Si compound and arranged on a glass substrate; and a fine-particle pigment dispersed in said $SiO_2$ and fixed therein wherein said organic Si compound is a polymer prepared by subjecting four-functionality alkoxysilane and an alkyl group-containing alkoxysilane or a photosensitive group-containing alkoxysilane to copolymerization.

2. A color filter as defined in claim 1, wherein said organic Si compound is a photosensitive group-containing polymer which is prepared by subjecting a four-functionality alkoxysilane and a photosensitive group-containing alkoxysilane to copolymerization.

3. A color filter as defined in claim 2, wherein the ratio at which said four-functionality alkoxysilane and said photosensitive group-containing alkoxysilane are mixed with each other is varied, resulting in the number of photosensitive groups in said polymer being controlled.

4. A color filter as defined in claim 1, wherein said organic Si compound includes a photopolymerization initiator and an auxiliary.

5. A color filter as defined in claim 1, wherein said fine-particle pigment has a particle diameter of 0.1 µm or less.

6. A color filter as defined in claim 1, wherein the ratio at which said four-functionality alkoxysilane and said alkyl group-containing alkoxysilane are mixed with each other is varied, resulting in the number of alkyl groups in said polymer being controlled.

7. A color filter comprising:

a glass substrate; and a $SiO_2$ film directly deposited on a surface of said glass substrate, said $SiO_2$ film being prepared by applying a film-forming liquid containing a photosensitive organic Si compound and a fine-particle pigment on the surface of said glass substrate to form a filter film, subjecting said filter film to patterning, and calcining said filter film.

8. A color filter as defined in claim 7, wherein said fine-particle pigment is a metal oxide having a particle diameter of 0.1 µm or less.

9. A method for manufacturing a color filter comprising:

preparing a filter forming liquid containing a fine-particle pigment, a photosensitive organic Si compound and a high-boiling polar solvent;

applying said filter-forming liquid directly on a glass substrate to form a filter film;

subjecting said filter film to patterning; and calcining said filter film-applied glass substrate.

10. A method for manufacturing a color filter as defined in claim 9, further comprising preparing a plurality of color filter-forming liquids, each containing a fine-particle pigment, a photosensitive organic Si compound and a high-boiling polar solvent wherein said method comprises repeated steps of applying a color filter-forming liquid directly on said glass substrate to form a color filter film on the glass substrate; exposing said color filter film to light through a mask of a predetermined pattern; removing an unexposed portion of said color filter film by development; and calcining said color filter-applied glass substrate.

11. A display device having a color filter comprising:

a glass substrate;

a $SiO_2$ film directly deposited on a surface of said glass substrate, said $SiO_2$ film being prepared by applying a film forming liquid containing a photosensitive organic Si compound and a fine particle pigment on the surface of said glass substrate to form a filter film, subjecting said filter film to patterning, and calcining said filter film-deposited glass substrate;

a light-permeable anode conductor formed on said $SiO_2$ film; and a phosphor layer formed on said anode conductor.

12. A method for manufacturing a display device having a color filter comprising:

forming a black matrix on a glass substrate;

forming a color filter on said glass substrate by preparing a filter-forming liquid containing a fine particle pigment, a photosensitive organic Si compound and a high-boiling polar solvent, then applying said filter forming liquid directly on the glass substrate to form a filter film; subjecting said filter film to patterning, and calcining said filter film-applied glass substrate;

forming a light-permeable anode conductor on said color filter; and forming a phosphor layer on said anode conductor.

* * * * *